United States Patent [19]

Monster et al.

[11] Patent Number: 5,656,059
[45] Date of Patent: Aug. 12, 1997

[54] METHOD FOR PROCESSING A LIQUID NITROGEN RICH ORGANIC WASTE PRODUCT, THEREBY OBTAINED FERTILIZER SOLUTION AND USE THEREOF

[75] Inventors: Anthonie Leendert Monster, Waterloo, Belgium; Willem Iman Koster, Bennekom, Netherlands

[73] Assignees: Epenhuysen Chemie N.V., Zwijndrecht; Ecotechniek B.V., Maarssen, both of Netherlands

[21] Appl. No.: 325,367

[22] PCT Filed: May 12, 1993

[86] PCT No.: PCT/BE93/00025

§ 371 Date: Jan. 4, 1995

§ 102(e) Date: Jan. 4, 1995

[87] PCT Pub. No.: WO93/23349

PCT Pub. Date: Nov. 25, 1993

[30] Foreign Application Priority Data

May 13, 1992 [NL] Netherlands .............. 9200845

[51] Int. Cl.[6] .................................... C05F 11/08
[52] U.S. Cl. ................................ 71/7; 71/64.1
[58] Field of Search .................. 71/6, 7, 8, 21, 71/23, 24, 12, 13, 15, 64.1

[56] References Cited

FOREIGN PATENT DOCUMENTS

| 0423889 | 4/1991 | European Pat. Off. . |
| 154693 | 4/1982 | Germany . |
| 3920539 | 11/1990 | Germany . |

OTHER PUBLICATIONS

K. Mudrack et al., *Biology of Sewage Treatment and Water Pollution Control*, John Wiley & Sons, 1986, pp. 117–129 no month.

M. Boës, "Stickstoffentfernung mit intermittierender Denitrifikation" in *Korrespondenz Abwasser*, vol. 38, No. 2, 1991, pp. 228–234 no month.

H. Bode, "Mesophile und thermophile Hochlastdenitrifikation bei stark nitrathaltigem Abwasser" in *Korrespondenz Abwasser*, vol. 38, No. 2, 1991, pp. 228–234 no month.

*Primary Examiner*—Ferris Lander
*Attorney, Agent, or Firm*—Watson Cole Stevens Davis, P.L.L.C.

[57] ABSTRACT

A method for processing a liquid nitrogen-rich organic waste product, in particular a manure product, to an aqueous fertilizer solution utilizes a biological conversion process so as to obtain a biologically stable fertilizer solution. This conversion process includes at least a nitrification step wherein nitrifiable ammonium nitrogen is converted in nitrate nitrogen and, only if the fraction to be nitrified has a too high content of nitrifiable nitrogen, a denitrification step. The fertilizer solution is separated off after the nitrification step so that it contains nitrate and only up to 150 mg $NH_4^+$-N/l at most. The fertilizer solution can be used as leaf nutrition or in a hydroponic system.

16 Claims, 2 Drawing Sheets

METHOD FOR PROCESSING A LIQUID NITROGEN RICH ORGANIC WASTE PRODUCT, THEREBY OBTAINED FERTILIZER SOLUTION AND USE THEREOF

BACKGROUND OF THE INVENTION

1. Field of the Invention

The present invention relates to a method for processing a liquid nitrogen-rich organic waste product to an aqueous solution, in which method the waste product is subjected to a biological conversion process so as to obtain a biologically substantially stable aqueous solution, which conversion process includes at least a nitrification step wherein nitrifiable ammonium nitrogen from the waste product is converted into nitrate nitrogen in a nitrification reactor by means of nitrifying bacteria, in the event the nitrate content in the so-obtained nitrified fraction would exceed a predetermined nitrogen content, the nitrate content is limited to a content at which the nitrifying bacteria are active by subjecting at least a portion of a previously nitrified fraction to a denitrification step and subsequently to the nitrification step together with a further fraction which is to be nitrified.

The expression "liquid nitrogen rich organic waste product" used herein refers in particular to liquid manure products as obtained directly from farms, for example semi-liquid manure, liquid manure and the like, but possibly also further processing products of these manure products such as for example the aqueous fraction obtained after removal of the solid fraction out of semi-liquid manure or the resulting products obtained after a partial fermentation of the manure product, for example for the production of biogas. Of course, also manure products of human origin are included in this expression. Further the expression also embraces other liquid nitrogen rich organic waste products such as for example waste water from composting installations.

2. The Prior Art

EP-A-0 423 889 in the name of one of both applicants discloses already a method for processing semi-liquid manure or fermented semi-liquid manure of the hereabove indicated type. In this known method, use is made of a water purification installation wherein the manure product is subjected successively to a nitrification step and subsequently to a denitrification step so as to obtain a purified aqueous solution wherein the nitrogen and the organic matter are eliminated as much as possible since the denitrified fraction is subsequently discharged.

In order to eliminate the nitrogen from the manure as completely as possible, a portion of the denitrified fraction is recycled to the nitrification reactor in such a manner that the nitrate content in this reactor is preferably limited to between 1000 and 1400 mg $NO_3^-$-N/l. Within these limits, an optimal conversion of ammonium to nitrate nitrogen is obtained. For the same reason, use is further made of methanol as necessary carbon and energy source for the denitrifying bacteria. When use would be made herefor of said manure product, ammonium nitrogen is again produced during the denitrification which nitrogen would therefore end in the effluent of the purification installation. In the method according to this European patent application, purified waste water is obtained as effluent from the denitrification reactor.

Such a method has, however, the drawback that all of the plant nutrition elements are lost. Moreover, such a purification is never complete so that an amount of polluents will always arrive in the surface waters. In order to recuperate a portion of these nutrient elements, the solid fraction can be separated in advance out of the manure and can be dried, which requires however a lot of energy. In this case, the liquid fraction remains moreover to be purified and has still to be discharged.

An object of the present invention is therefore to provide a new method for processing liquid nitrogen rich organic waste products which obviates the hereabove indicated drawbacks and which permits in particular the nutrient elements present in this waste product to be used in a useful way.

The method according to the invention is characterized to this end in that said liquid nitrogen rich waste product is processed to an aqueous fertilizer solution which is separated off out of said nitrification reactor after the nitrification step and said denitrification step for limiting the nitrogen content is only performed if the fraction to be nitrified has a content of nitrifiable nitrogen which is higher than a predetermined maximum nitrogen content of at least 3000 mg nitrifiable nitrogen per liter, in which case the nitrate content in the nitrified fraction is limited by said denitrification step to a content of between 1500 mg $NO_3^-$-N/l and said predetermined maximum nitrogen content.

In contrast to the method according to EP-A-0 423 889, an aqueous solution is separated off in the method according to the invention after the nitrification step, more particularly an aqueous fertilizer solution containing plant nutrition elements including nitrates. A denitrification step for limiting the nitrogen content is only performed if this nitrate content after the nitrification would exceed a certain maximum value at which the nitrate concentration would hamper the biological processes too strongly. Indeed, the plant nutrition elements including nitrogen are preferably retained as much as possible.

Due to the fact that the obtained product is biologically substantially stable, it can be added for example to a nutrient solution for a hydroponic culture without bringing about aerobic biological processes which would withdraw too much oxygen which is essential for the plants from the nutrient solution. Further, the nitrification step is also important. Indeed, the nitrogen present in the waste product mainly in the form of ammonium is converted in this step into nitrate nitrogen. In a hydroponic culture, the presence of ammonium has an inhibiting influence on the uptake of other cations such as potassium. A high ammonium concentration is moreover even harmful for the plants. Since the waste product, such as for example semi-liquid manure, has a high ammonium-content, it is consequently clear that such a product cannot be used as such in a hydroponic culture, even not when the solid fraction has been removed or when the organic matter has been decomposed moreover in a conventional aerobic water purification installation or in a fermentation installation. Indeed, in these latter cases the ammonium content remains still too high. A sufficiently far-reaching nitrification is further also important in order that the fertilizer solution will be substantially free from nitrites, since nitrites are even more harmful for plants than ammonium.

An important advantage of the method according to the invention consists in that it allows to convert a nitrogen rich organic waste product into a valuable fertilizer solution which is in particular suited for feeding plants in an hydroponic system or for being used as leaf nutrition. By using such a waste product, an important saving as to raw materials such as inorganic salts which are normally used for producing the fertilizer solutions, can be realized. Further, a saving of energy is realized since the manufacture of synthetic fertilizers requires a large amount of energy. The method according to the invention requires on the other hand only a little amount of energy since the nutrient elements present in the waste product are converted mainly by biological processes into a form absorbable by the plant.

In the method according to DE-C-3920539 for processing semi-liquid manure, this manure is also first nitrified, just as in EP-A-0 423 889, and subsequently denitrified in order to eliminate therefrom an amount of the nitrogen present therein. The so obtained denitrified product is however not a fertilizer solution but has still the same applications as the original semi-liquid manure and can clearly not be used in hydroponic systems or as leaf nutrition. Indeed, besides an amount of solid organic matter, the obtained product further still contains an important amount of ammonium and possibly even of nitrite due to the large amount of organic matter, the oxidation of which will consume much oxygen during the nitrification step.

DD-A-154693 discloses also a method for processing semi-liquid manure. In this known method, the solid matter is separated first out of the manure. The resulting liquid is then denitrified and nitrified, and the nitrified fraction is recycled again in this purification process. A portion of the nitrified fraction is namely recycled to the denitrification reactor while the remaining portion is added to the semi-liquid manure in the stable so as to obtain a prior denitrification. The ratio between both portions is determined in function of the pH changes in both reactors and in function of the amount of nitrate which is required in the denitrification reactor to decompose the organic matter. Due to the very high content of organic matter, a large portion of the nitrogen will consequently be eliminated in the denitrification reactor whereas the remaining organic matter in the influent to the nitrification reactor prevents the nitrifying bacteria from converting all of the nitrifiable nitrogen completely into nitrate so that the nitrified fraction will comprise a relatively high amount of ammonium and even of nitrite.

SUMMARY OF THE INVENTION

In the method according to the invention, it is important that use is made of a nitrogen rich organic waste product. Such a waste product contains considerably more nitrogen than the usual waste waters to be purified. Indeed, the nitrogen rich waste product contains at least 1500 mg N/l, and preferably at least 2000 mg N/l, whereas municipal sewage contains for example only 30–50 mg N/l.

In this respect it is known to purify such waste waters by a nitrification-denitrification process whereby, according to M. Boës in "Korrespondenz Abwasser" 38 (1991) February, No. 2 purified water can be obtained having less than 5 mg N/l. In the purification process disclosed in this publication, the organic matter is decomposed during the denitrification step which is performed prior to the nitrification step. The low N-content in the effluent requires a sufficient recirculation and of course also a low N-content in the waste water.

In a preferred embodiment of the method according to the invention, the ammonium content is reduced in the nitrification step to a content of 150 mg $N_4^+$-N/l at the most, and preferably to a content of 100 mg $NH_4^+$-N/l at the most, and in particular to a content of 75 mg $N_4^+$-N/l at the most. After a dilution of, for example, 20 to 25 times, a suitable ammonium content is obtained in the nutrient solution for the substrate culture which has no harmful influence on the plant growth. An ammonium content which is as low as possible is to be preferred.

The possible denitrification step can be performed as well in said nitrification reactor as in a separate denitrification reactor.

In contrast to the method according to EP-A-0 423 889 the nitrogen rich manure product can be used in the method according to the invention as carbon and energy source for the denitrifying bacteria since the denitrified fraction is recycled anyway to the nitrification reactor. In this way no costs have to be made for a separate carbon and energy source such as for example methanol and a decomposition of the organic matter present in the waste product is obtained at the same time. However, if desired, such a separate carbon and energy source can also be used in the method according to the invention. The method according to the invention requires further no accurate control of the amount of organic matter which is added to the denitrification reactor. As a matter of fact, the denitrified fraction is indeed recycled to the nitrification reactor wherein a possible rest amount of organic matter is decomposed then further through an aerobic decomposition process.

In a preferred embodiment of the method according to the invention, solid particles present in the liquid waste product are removed, for example by means of a filter press or a decanting centrifuge, before subjecting the waste product to the nitrification step or possibly to the denitrification step. In this way, suspended particles from the waste product are prevented from taking in the place of the bacteria in the biomass sludge which would result in a capacity decrease of the reactor.

The liquid organic waste product is preferably fermented in advance in order to reduce the organic matter content of this product, in particular when this liquid waste product has a dry matter content higher than or equal to 4 to 5% by weight. For lower dry matter contents, it is less appropriate to perform a fermentation in advance since such low dry matter contents can also be decomposed biologically in the nitrification and/or denitrification reactor. An advantage of a prior far reaching fermentation, which is possibly even as complete as possible, of the nitrogen rich waste product consists in that, when a denitrification step is applied, this denitrification step becomes better controllable. Indeed, in that event, a different carbon and energy source can be chosen for example in function of the desired pH in the denitrification reactor. At the same time, the dosage of this carbon and energy source can be adjusted more accurately to the desired denitrification level, this when a too large amount of nitrified fraction is subjected to the denitrification so that this denitrification may only be performed up to a predetermined denitrification level. A further advantage of a prior fermentation is that in this way nitrogen and also other plant nutrition elements present in the waste product in organically bound form will arrive in the liquid phase. The organically bound nitrogen is more particularly converted into inorganic ammonium nitrogen which is thus available for nitrification. This is in particular important when the solid particles are subsequently removed out of the manure product since otherwise a large amount of valuable plant nutrition elements would be lost in this way via the solid fraction.

After a far-reaching fermentation, the organic matter content or the BOD-value of the waste product is small compared to the nitrogen content. In this case, when a denitrification step is performed, the fermented waste product is preferably entirely added as carbon and energy source for the denitrifying bacteria to the denitrification reactor, possibly together with an additional carbon and energy source. In this case, one reactor which serves both as nitrification and denitrification reactor is sufficient. In this way, the necessary pumping operations and the number of ducts can be reduced considerably. Further, the biogas produced in the fermentation reactor is a valuable additional energy source.

The invention also relates to a fertilizer solution which can be obtained by applying the method according to the invention and which is characterized in that it comprises a nitrified nitrogen rich organic waste product which is biologically stabilized through a biological conversion process and which has been subjected to a solids/liquid separation, which fertilizer solution contains an amount of biologically substantially not decomposable dissolved organic matter, including humus compounds, and up to 150 mg $NH_4^+$-N/l at the most.

As indicated already hereinabove, such a fertilizer solution can be used as leaf nutrition and in particular also for producing a diluted nutrient solution for hydroponic systems.

In such a system the roots of the plants are situated in an artificial environment. Such an artificial environment offers the advantage of allowing the grower to control the composition of this environment constantly so as to realize a maximum production. A drawback compared to a natural soil environment is however that this artificial environment is far less buffered and this both chemically and biologically. At the same time this artificial environment offers the possibility for a fast development and, especially in a N.F.T-system, also the possibility for a quick spreading of so-called soil-borne diseases. Moreover, plants which are in a stress condition are more sensitive to these diseases than plants which grow in an optimal natural environment.

An important advantage of the fertilizer solution according to the invention is that it contains dissolved organic matter and in particular humus compounds such as humus and fulvo-acids. Such compounds are also present in the natural soil environment. By the use of the fertilizer solution according to the invention in a hydroponic culture, the plants and also their fruits are influenced in a same manner by the presence of these organic compounds as plants which are grown in the soil and this as to the uptake of nutrient elements, the development of the plant, the taste of the fruits and the like. In particular it was clearly observed that humus compounds may enhance the growth of plants in a hydroponic culture.

The fertilizer solution according to the invention has in a hydroponic culture also a favourable effect against the development of diseases, more particularly of the so-called soil-borne diseases which penetrate through the roots into the plant. Indeed, the development of pathogenic micro-organisms is reduced by the presence of micro-organisms in the root environment. Some of the present micro-organisms may even show possibly an antagonistic activity.

In a preferred embodiment of the fertilizer solution according to the invention, this solution contains between 0.01 and 0.5% by weight, preferably between 0.1 and 0.3% by weight, and in particular between 0.15 and 0.25% by weight, of humus compounds.

Further particularities and advantages of the invention will become apparent from the following description of some embodiments of a method for processing a liquid nitrogen rich organic waste product into a fertilizer solution according to the invention. First there is however described a fertilizer solution according to the invention, which can be obtained through this method. These descriptions are only given by way of example and do not limit the scope of the invention. The reference numerals relate to the annexed drawings.

DETAILED DESCRIPTION OF THE PREFERRED EMBODIMENTS

Figure 1:
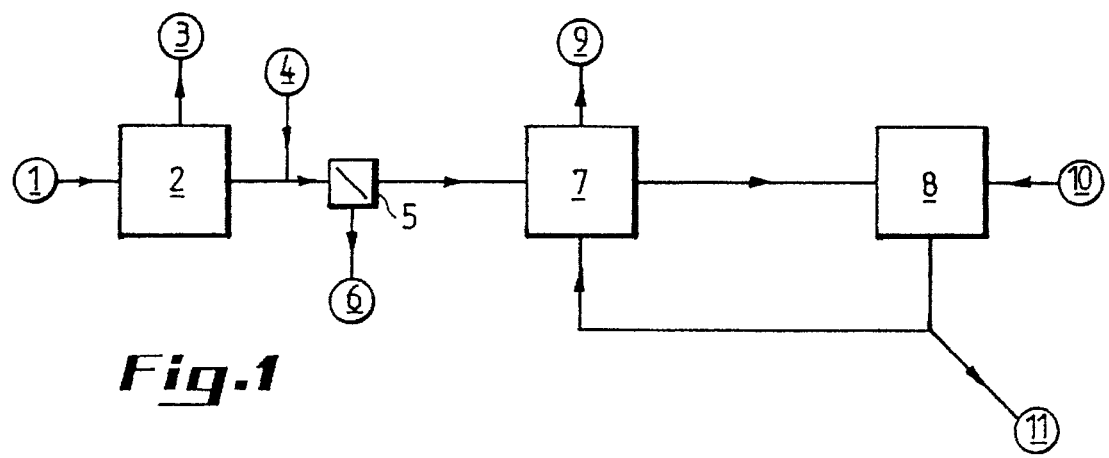
FIGS. 1, 2, 3 and 4 show four different diagrams of a method for preparing a fertilizer solution according to the invention, starting from semi-liquid manure.

In these four figures, the same reference numerals relate to the same or to analogous elements.

The invention relates to a fertilizer solution which is in particular suited for composing a diluted nutrient solution for a hydroponic culture. However, the fertilizer solution can also be used for leaf nutrition and possibly even for fertilizing the soil. Compared to soil fertilization leaf nutrition offers the advantage that the plant nutrition elements are directly applied onto the plant and are no longer lost by leaching. Leaching of these elements, such as for example nitrates, is moreover an important source of pollution of the ground water layers. An essential characteristic of the fertilizer solution according to the invention consists in that this solution contains a nitrified nitrogen rich organic waste product which is biologically stabilized through a biological conversion process. Due to the nitrification, the fertilizer solution contains up to 150 mg $NH_4^+$-N/l at the most. Further, the solid particles are removed out of this fertilizer solution by a solid matter/liquid separation. As already described hereabove, the nitrogen rich waste product may possibly already be subjected to a number of processes such as a fermentation or a solid matter removal. The biologically stabilized organic waste product does not only supply inorganic nutrition elements, such as the nutrition elements potassium and nitrate, which are important for the plant, in the fertilizer solution but moreover also an amount of biologically substantially not decomposable dissolved organic matter, including humus compounds.

Due to the presence of this organic matter in the nutrient solution for a hydroponic culture, the composition of this nutrient approaches closer to the natural composition of the root environment in the soil. It was found that the use of a fertilizer solution containing between 0.01 and 0.5% by weight, preferably between 0.1 and 0.3% by weight, and in particular between 0.15 and 0.25% by weight of humus compounds has favourable influences on the development of the crop, in particular for a 20 to 25 times dilution of this solution. These humus compounds embrace both humus acids and fulvo-acids. Advantageously the fertilizer solution contains up to 1.3% by weight at the most, and preferably up to 0.8% by weight at the most, of organic matter.

The presence of micro-organisms in the fertilizer solution provides for an inhibition of the development of possible pathogenic micro-organisms. In a recirculating N.F.T-system there has for example been observed that the use of a fertilizer solution according to the invention strongly inhibits the algal growth. In new substantially sterile greenhouses, on the other hand, a very fast development of pathogenic germs is possible. In an effective embodiment, the fertilizer solution according to the invention has an aerobic germination number, measured at a temperature of about 22° C., which is higher than 300.000 germs/ml and which is preferably situated between 400.000 and 600.000 germs/ml.

An important portion of the inorganic nutrient elements present in the fertilizer solution consists of nitrate nitrogen. For a 20 to 25 times dilution of the fertilizer solution, it appeared to be suitable for most of the plants that the fertilizer solution contains at least 1500 mg $NO_3^-$-l, preferably 2.000 to 4.000 mg $NO_3^-$-N/l and in particular 3000 to 4000 mg $NO_3^-$-N/l. Such amounts of nitrogen can be supplied at least partially by the biologically stabilized liquid nitrogen rich organic waste product in the fertilizer solution. However, it will be clear that the composition of this solution can further still be adapted to the requirements of the plant by adding further inorganic substances. Said substances are known per se for composing the existing inorganic fertilizer solutions for hydroponic cultures.

The following Table 1 gives an example of a basic fertilizer solution prepared on the basis of semi-liquid pig manure without addition of additional inorganic plant nutrition elements.

TABLE I

Composition of a fertilizer solution according to the invention exclusively prepared on the basis of semi-liquid pig manure.

| Cations (mmol/l) | | Anions (mmol/l) | | Trace elements (micromol/l) | |
| --- | --- | --- | --- | --- | --- |
| $NH_4^+$ | 6 | $NO_3^-$ | 240 | Fe tot. | 69 |
| $K^+$ | 168 | $NO_2^-$ | — | $Mn^{2+}$ | 2 |
| $Na^+$ | 32 | $Cl^-$ | 54 | $Zn^{2+}$ | 26 |
| $Ca^{2+}$ | 2 | $SO_4^{2-}$ | 4 | $B^{3+}$ | 240 |
| $Mg^{2+}$ | 2 | $HCO_3^-$ | 34 | $Cu^{2+}$ | 32 |
| | | $H_2PO_4^-$ | 4 | | |

To this basic fertilizer solution further plant nutrition elements can be added for example in function of the requirements of a certain crop. These additional plant nutrient elements may possibly be dosed besides the basic fertilizer solution separately to the crop.

In the method according to the invention for preparing a fertilizer solution, a liquid nitrogen rich organic waste product is subjected to a biological conversion process so that a biologically substantially stable product is obtained. By biologically stable product is meant here that this product, when used in a hydroponic system, is substantially not decomposed further in the nutrient solution so that a sufficient amount of oxygen which is essential for the plants remains in this nutrient solution. The biological conversion process includes at least one nitrification step wherein nitrifiable ammonium nitrogen is converted by means of aerobic nitrifying bacteria in an aerated nitrification reactor into nitrate nitrogen. After the nitrification, the fertilizer solution is separated off out of the nitrification reactor.

The nitrification step is an essential step in the method according to the invention since the organic waste product, in particular a manure product, contains mainly ammonium nitrogen whereas plants take up mainly nitrate nitrogen. In higher concentrations, ammonium is even toxic for the plants. In order to avoid this, the ammonium content is reduced in the nitrification step to a content of 150 mg $NH_4^+$-N/l at the most and preferably to a content of 100 mg $NH_4^+$-N/l at the most. The method according to the invention allows in particular to reduce the ammonium content to a content lower than 75 mg $NH_4^+$-N/l. In experiments, an ammonium content of about 15 mg $NH_4^+$-N/l has for example already been realized.

The nitrification of the ammonium nitrogen may be followed by means of a respiration meter, for example a WAZU respiration meter as described in the Dutch patent application No. 8600396. When the respiration of the nitrifying bacteria has fallen back to an endogenous respiration level, the nitrification is ended. The end of the respiration can also be determined by following the evolution of the oxygen content, an increase of the oxygen content at a constant aeration indicating a decrease of the respiration. Further it is also possible to maintain a constant oxygen content by means of the aeration installation. A decrease of the required aeration capacity indicates then a decrease of the respiration.

The nitrification reactor is loaded according to a so-called batch-process, preferably according to a so-called feed batch-process wherein the fraction to be nitrified is added to the nitrification reactor in at least two steps. During the nitrification step, the pH of the solution is kept substantially constant onto a pH value situated between pH 6 and pH 8.5 so that the nitrifying bacteria Nitrosomonas and Nitrobacter are sufficiently active. For this pH control, an alkaline substance has to be added to the solution since the nitrification involves an acidification of the solution. In order to avoid as much as possible precipitation of certain substances, such as phosphates, the pH is preferably kept constant on a pH value equal to or below pH 7, preferably on a pH value situated between pH 6 and pH 7, and in particular on a pH value of about 6.5.

In contrast to the known methods for processing nitrogen rich manure products, a denitrification step for limiting the nitrate content of the nitrification reactor is performed in the method according to the invention only if the fraction to be nitrified has a content of nitrifiable nitrogen which is larger than a predetermined maximum nitrogen content of at least 3000 mg nitrifiable nitrogen per liter. This nitrifiable nitrogen embraces both the ammonium nitrogen and the biologically decomposable Kjeldahl-nitrogen. By subjecting a portion of the nitrified fraction to a denitrification step and nitrifying it subsequently together with a further fraction to be nitrified, the nitrate content in the nitrified fraction is limited to a content of between 1500 mg $NO_3^-$-N/l and said predetermined nitrogen content.

In a preferred embodiment, the nitrate content in the nitrified fraction is limited to a nitrate content of between 2000 mg $NO_3^-$-N/l and said maximum nitrogen content and preferably to a nitrate of between 3000 mg $NO_3^-$-N/l and said maximum nitrogen content. In order to valorize the available nitrogen as much as possible, this nitrate content is preferably limited to a content which is substantially equal to the predetermined maximum nitrogen content. This maximum nitrogen content is advantageously smaller than 6000 mg N/l in order to permit the nitrifying bacteria to nitrify most of the nitrifiable nitrogen. Preferably, it is situated between 3000 and 4000 mg nitrifiable nitrogen per liter, and more particularly between 3500 and 4000 mg nitrifiable nitrogen per liter.

In a first particular embodiment of the method according to the invention, both the nitrification and the possible denitrification step are performed in one and the same reactor, more particularly in the hereabove mentioned nitrification reactor. During the nitrification step, an oxygen containing gas such as air is introduced into this reactor. This reactor is more particularly aerated by means of surface aerators or by gas diffusion systems. After the aeration, the present biomass is allowed to settle down and a portion of the nitrified fraction is subsequently removed so that a predetermined amount of nitrified fraction remains in the reactor. To this remaining amount of nitrified fraction, a carbon and energy source for the denitrifying bacteria is then added, such as for example an amount of either or not fermented waste product and/or an amount of another organic substance, for example methanol. The biomass is admixed under anoxic conditions into the fraction to be denitrified so that the denitrifying bacteria can start the denitrification. The nitrifying bacteria on the other hand are not active under these anoxic circumstances. For the nitrification step, a further amount of nitrogen rich organic waste product is added to the reactor, at least when this has not already been added as carbon and energy source prior to the denitrification.

Performing the nitrification and the denitrification step in one and the same reactor is especially interesting when the waste product to be added to this reactor has a low BOD-value, in particular a BOD-value, expressed in ml $O_2/l$, which is at the most somewhat higher than 3.5 times the reduction of the nitrogen content, expressed in mg N/l, which has to be obtained by denitrification. Such a BOD-value may be obtained by a prior fermentation of the waste product. In this way, the method according to the invention requires therefore two reactors, i.e. an anaerobic fermentation reactor wherein organic matter is converted into biogas and a nitrification-denitrification reactor. Before adding the either or not fermented waste product to the nitrification and/or denitrification reactor, the solid particles are preferably removed herefrom so as to prevent them from taking in the place of the biomass.

In a second particular embodiment of the method according to the invention, the possible denitrification step is performed in a separate denitrification reactor. This embodiment includes also that the nitrification and the denitrification can be performed in different zones of the same reactor. As carbon and energy source for the denitrifying bacteria, use is preferably made of said nitrogen rich waste product, the solid particles of which having particularly been removed in advance. When this waste product has a high BOD-value, or in other words when no prior fermentation was performed, the denitrification requires only a relatively small amount of waste product. In particular, such an amount of waste product is added to the denitrification reactor which provides in this way an amount of organic matter for the denitrifying bacteria which is sufficient for permitting these bacteria to denitrify the required amount of nitrate nitrogen. Since the denitrified fraction is not discharged but is added again to the nitrification reactor, it is not necessary to denitrify all of the available nitrate. Moreover, the added amount of organic matter may be larger than the amount required for the nutrition of the denitrifying bacteria since the denitrified fraction will be subsequently treated in the aerated nitrification reactor wherein this organic matter will further be decomposed under aerobic conditions.

The nitrogen rich organic waste product may therefore be added entirely to the denitrification reactor. This is especially advantageous when this product has a BOD-value, expressed in ml $O_2/l$, which is at the most somewhat higher than 3.5 times the nitrate content, expressed in mg N/l, which has to be denitrified. With a higher BOD-value, the waste product has not to be added entirely to the denitrification reactor and the capacity of this reactor may consequently be reduced.

The waste product is preferably fermented in advance before adding this to the nitrification reactor so that only a limited decomposition of organic matter is required in this nitrification reactor to obtain a biologically stable product. Such a fermentation is in particular efficient when the liquid waste product has a dry matter content higher than or equal to 4 to 5% by weight. At a lower dry matter content, it is to be preferred to provide an aerobic nitrification reactor having a sufficient decomposition capacity instead of an additional fermentation installation. After the fermentation, the solid matter is preferably removed for example by means of a centrifuge. By the fermentation, not only an amount of organic matter is decomposed but this decomposition brings also an amount of nitrifiable ammonium nitrogen and possibly still further plant nutrition elements in the solution.

The denitrification processes bring about a pH increase in the denitrification reactor during the denitrification. In order to prevent certain substances such as for example phosphates as much as possible from being precipitated due to this pH increase, the pH in the denitrification reactor is preferably controlled by adding an acid substance, for example by adding an organic acid, or by the choice of the carbon and energy source for the denitrifying bacteria. In particular the pH is kept substantially constant at a pH value lower than pH 7, preferably at a pH situated between pH 6 and pH 7 and particularly at a pH value of about 6.5.

In a preferred embodiment of the invention, the fertilizer solution separated off out of the nitrification reactor is further treated to remove particles present in this solution, such as floating bacteria flocks and the like. Suitable techniques hereto are for example filtration- and/or precipitation techniques wherein use may possibly be made of flocculation agents such as polyelectrolytes. Since the fertilizer solution is not a saturated solution, further additional inorganic plant nutrition elements may be incorporated into this solution. In this way, the composition of the fertilizer solution can be adjusted to the nutrient requirements of the plants.

Some examples of the conversion of different kinds of nitrogen rich organic waste products, in particular manure products of animal origin, by applying the method according to the invention into a fertilizer solution which is in particular useful for hydroponic systems are given hereinafter. In these examples both the nitrification step and the possible denitrifation step are carried out at a temperature in the mesophilic temperature range.

EXAMPLE 1

In this example use is made of semi-liquid pig manure having a dry matter content of about 10% by weight and a content of nitrifiable nitrogen of about 6800 mg $NH_4^+$-N/l. Due to this high nitrogen content a denitrification step is required, for example so as to halve the nitrogen content. Further, in view of the high organic matter content, a fermentation step is also appropriate.

FIG. 1 shows a possible diagram for the conversion of this semi-liquid pig manure. In a first step, the manure 1 is fermented in a fermentor 2 under anaerobic conditions whereby biogas 3 is produced. After the fermentation, polyelectrolytes 4 are added and the solid fraction 6 is separated off from the fermented fraction by means of a decanting centrifuge 5. The so-obtained solution has still a BOD-value of about 12000 mg $O_2/l$.

When a final nitrate content of 3400 mg $NO_3^-$-N/l is aimed at, substantially 3400 mg $NO_3^-$-N/l (=6800–3400) have to be denitrified. Since the hereabove mentioned BOD-value is only somewhat higher than 3.5 times this nitrate content to be denitrified, the total amount of fermented fraction is preferably added to the denitrification reactor 7. Since the nitrogen content has to be halved to 3400 mg N/l, one portion of a fraction which has already been nitrified previously in the nitrification reactor 8 is added to the denitrification reactor per portion of fermented fraction. In the denitrification reactor 7 the nitrate is then denitrified into $N_2$-gas 9 and the largest portion of the available biologically decomposable organic matter is then also decomposed. After the denitrification, the mixture of fermented fraction and of already nitrified fraction contains about 3400 mg nitrifiable N/l. These two portions of mixture are then nitrified in the nitrification reactor so that the nitrifiable nitrogen is converted into nitrate nitrogen. To this end, air 10 is injected into the nitrification reactor until the respiration of the nitrifying bacteria has fallen back down to an endogenous respiration level.

After sedimentation, one portion of the nitrified fraction is added back to the denitrification reactor and a second portion is separated off as fertilizer solution 11. It is clear that in this simplified example, the small amounts of nitrogen which are removed via the separated solid fractions have not been taken into account.

EXAMPLE 2

Figure 4:
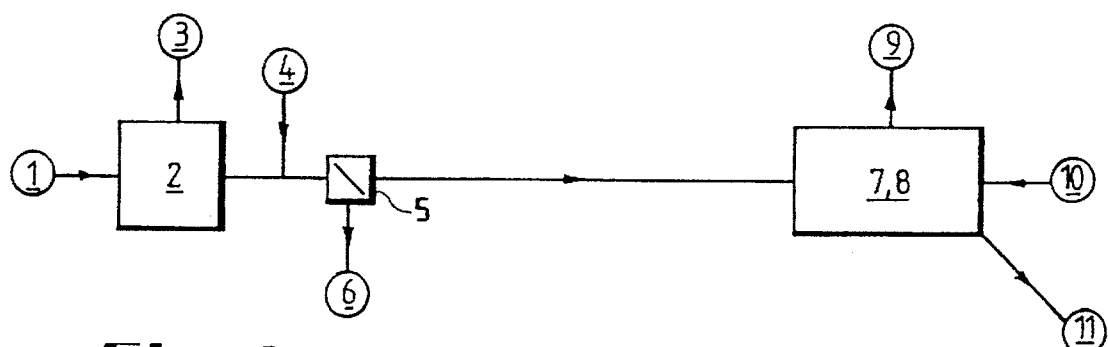

In this example semi-liquid pig manure of the same composition as in example 1 is fermented in a first step also in the same way. As indicated in FIG. 4, the nitrification and the denitrification step are however performed in this example in one and the same reactor 7, 8.

In a first step, one portion of fermented semi-liquid manure is pumped into the nitrification-denitrification reactor 7, 8 wherein an amount of an already previously nitrified fraction is still present. The reactor 7, 8 is then stirred but not aerated. The biomass and the liquid phase are therefore intensively into contact with one another. This biomass consists of a mixture of mesophilic nitrifying and denitrifying bacteria. In this process phase, the denitrifying bacteria will convert nitrate, from a previous load manure which has already undergone an aerated phase into nitrogen gas while using organic matter (BOD) from the new load of fermented animal manure.

After a predetermined time, or after a nitrate analysis has shown that no nitrate is further decomposed (BOD exhausted) or after a nitrate analysis has shown that the desired nitrogen level has been reached in the liquid, an aeration is started. The nitrifying bacteria from the biomass mixture will now convert the ammonium nitrogen supplied through the new load into nitrate. At the same time the possibly still available organic matter is decomposed further under aerobic conditions. The control method is the same as the one for the separate nitrification reactor.

Subsequently the aeration is stopped, the biomass settles down and a portion of fertilizer solution is separated off out of the reactor 7, 8 while an amount of the nitrified fraction still remains in the reactor. Then the cycle starts again with the first step.

If the semi-liquid manure has been fermented first to a lower BOD-value, an additional carbon and nitrogen source has to be added for the denitrifying bacteria such as for example a non-fermented semi-liquid manure or methanol. This offers the advantage of the denitrification step being better controllable. Indeed, in that event a certain carbon and energy source can be selected in function of the desired pH. Also the dosage thereof can be adjusted more accurately to the desired denitrification level.

EXAMPLE 3

Figure 2:
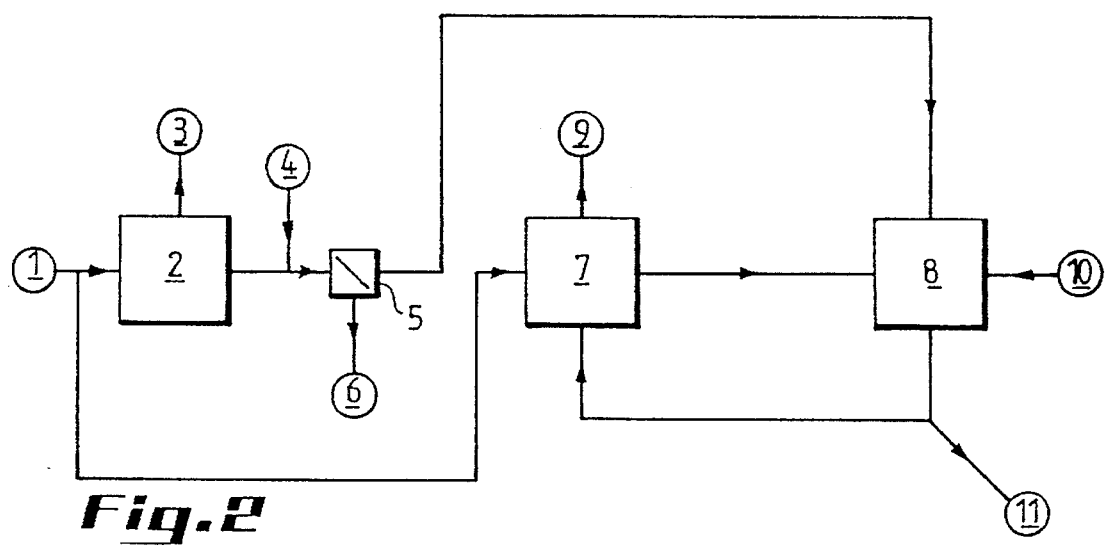

In this example use is also made of the same semi-liquid pig manure as in example 1 but this manure is however converted according to a somewhat different method to a fertilizer solution according to the invention. This method is shown schematically in FIG. 2.

An important difference with example 1 is that in this third example the largest portion of the semi-liquid manure is fermented down to a low BOD-value, for example lower than 4000 mg $O_2$/l. As carbon and energy source for the denitrifying bacteria use is therefore made of an amount of non-fermented semi-liquid manure. The fermented fraction is supplied directly to the nitrification reactor together with such an amount of denitrified fraction that the final nitrate content comprises after the nitrification step about 3400 mg $NO_3^-$-N/l. However, if desired higher nitrate contents can be obtained, for example even up to a content of 5000 to 6000 mg $NO_3^-$-N/l.

EXAMPLE 4

In this example use is made of semi-liquid manure from breeding-sows and piglings having a dry matter content of about 5% by weight and a content of nitrifiable nitrogen of about 4000 mg $NH_4^+$-N/l. This semi-liquid manure is then converted according to the same diagram as in example 3 (FIG. 2) into a fertilizer solution. The most important difference with example 3 is that in this fourth example only one portion nitrified fraction is fed per six portions to the denitrification reactor. After denitrification, this one portion is recycled with about five other portions of fermented fraction to the nitrification reactor so that the final nitrate content will comprise about 3330 mg $NO_3^-$-N/l.

EXAMPLE 5

Figure 3:
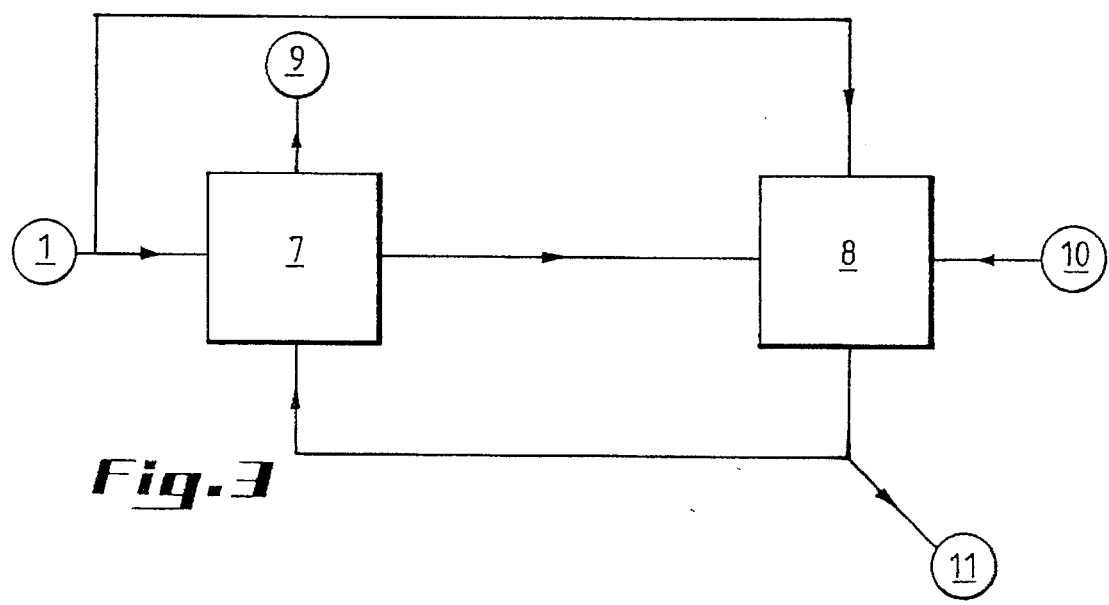

In this example use is made of semi-liquid manure of breeding-sows and piglings having a dry matter content of about 4% by weight. In a first step, the solid particles are removed therefrom. The so-obtained organic waste product has a content of nitrifiable nitrogen of about 4000 mg $NH_4^+$-N/l and a BOD-value of about 100,000 mg $O_2$/l. The followed method is shown schematically in FIG. 3. In contrast to the previous examples, this method includes no fermentation step.

In order to obtain a final nitrate content of 3500 mg $NO_3^-$-N/l, about ⅛ of the nitrified fraction has to be denitrified in the denitrification reactor 7. In this example semi-liquid manure, the solid particles of which are removed, is directly added both to the denitrification reactor 7 and to the nitrification reactor 8. Per portion of nitrified fraction which is denitrified, about seven portions of manure are added in total to the denitrification reactor and to the nitrification reactor so as to reduce the nitrogen content to ⅞ of the original nitrogen content in the animal manure. Since the denitrification of 1 mg $NO_3^-$-N involves a reduction of the BOD-value with about 3.5 mg $O_2$, it can be calculated how much manure has to be added at least to the denitrification reactor to provide a sufficient amount of organic matter for the denitrifying bacteria. The portion of the nitrified fraction which is to be denitrified contains about 3500 mg $NO_3^-$-N/l so that an amount of animal manure having a BOD-value of at least 3500×3.5=12250 mg $O_2$ is required thereto. This corresponds to a minimum amount of 0.123 l animal manure per liter (BOD-value=100,000 mg $O_2$/l.) fraction to be denitrified. In this example, about 0.5 portion of the manure is added for safety's sake to the denitrification reactor and the remaining 6.5 portions to the nitrification reactor. In this reaction, sufficient oxygen is supplied for reducing the ammonium content to a value smaller than 150 mg $NH_4^+$-N/l. In order to reduce this need for oxygen, a prior fermentation is to be preferred.

EXAMPLE 6

In this example use is made of semi-liquid manure from meat calves having a dry matter content of about 2% by weight and a content of nitrifiable nitrogen of about 3000 mg $NH_4^+$-N/l, after biological decomposition of the biologically decomposable organic matter.

Due to this low nitrogen content, no denitrification is required. Consequently, no organic matter has to be available as nutrient source for the denitrifying bacteria. This semi-liquid manure may therefore be fermented first and nitrified after having removed the solid particles, whereby during the aerobic nitrification not only the ammonium nitrogen is converted into a nitrate nitrogen but whereby moreore a further, in this case aerobic decomposition of the organic matter occurs. The nitrogen present in this organic matter and released during the aerobic decomposition as ammonium nitrogen, is also converted into nitrate nitrogen in this nitrification step and is therefore also nitrifiable nitrogen.

In this case, no fermentation is preferably applied due to the low dry matter content of the semi-liquid manure. The organic matter is decomposed on the other hand exclusively in the aerated nitrification reactor. To this end, it may be required to provide a larger aeration capacity which is however outweighed by the costs for a separate fermentation installation. Due to the low organic matter content, it is both possible to decompose the organic matter and to obtain a sufficient conversion of ammonium nitrogen into nitrate nitrogen in the nitrification reactor.

It will be clear that the invention is in no way limited to the hereabove described embodiments but that they may be modified in many ways without leaving the scope of this patent application.

We claim:

1. A method for preparing a fertilizer solution wherein a liquid nitrogen-rich organic waste product is subjected to a biological conversion process so as to obtain a biologically substantially stable nitrate-containing aqueous fertilizer solution, said biological conversion process comprising at least a nitrification step wherein nitrifiable ammonium nitrogen from said waste product is converted by means of nitrifying bacteria into nitrate nitrogen in a nitrification reactor and, when the waste product has a nitrogen content higher than a predetermined maximum nitrogen content of between 3000 mg and 6000 mg nitrifiable nitrogen per liter, said biological conversion process comprises a denitrification step performed on at least a portion of a previously nitrified fraction, which is subsequently subjected again to the nitrification step together with a further fraction which is to be nitrified in order to limit the nitrate content in the nitrified fraction to a content of between 1500 mg $NO_3$-N/l and said predetermined maximum nitrogen content, said biologically substantially stable nitrate-containing aqueous fertilizer solution being separated off after completion of the nitrification step out of the nitrification reactor.

2. A method according to claim 1, wherein the nitrate content in the nitrified fraction is limited through said denitrification step to a nitrate content of between 2000 mg $NO_3$-N/l and said predetermined maximum nitrogen content.

3. A method according to claim 1, wherein said predetermined maximum nitrogen content is between 3000 and 4000 mg nitrifiable nitrogen per liter.

4. A method according to claim 3, wherein said predetermined maximum nitrogen content is between 3500 and 4000 mg nitrifiable nitrogen per liter.

5. A method according to claim 1, wherein in said nitrification step, the ammonium content is reduced to a content of 150 mg $NH_4^+$-N/l at the most.

6. A method according to claim 1, wherein an oxygen-containing gas is supplied in the nitrification reactor during the nitrification step, the respiration of the nitrifying bacteria is followed during this nitrification step, and the nitrification is stopped after this respiration has fallen back to an endogenous respiration level.

7. A method according to claim 1, wherein when the denitrification step is performed, both the nitrification step and the denitrification step are performed in said nitrification reactor, whereto an oxygen-containing gas is introduced into the nitrification reactor during the nitrification step, this gas supply is then stopped, an amount of nitrified fraction is removed so that said portion of the nitrified fraction remains in the nitrification reactor, a carbon and energy source for denitrifying bacteria present in said nitrification reactor is added to this nitrification reactor, in particular at least a portion of said liquid organic waste product, and said denitrification step is performed, in particular by stirring the liquid present in the nitrification reactor substantially without oxygen addition.

8. A method according to claim 1, wherein when denitrification step is performed, said denitrification step is performed in a separate denitrification reactor and said liquid waste product is at least partially added to this denitrification reactor as a carbon energy source for denitrifying bacteria present in the denitrification reactor, in particular in such an amount that this amount of liquid waste product provides an amount of carbon and energy for the denitrifying bacteria which is sufficient for permitting these bacteria to denitrify the required amount of nitrate nitrogen.

9. A method according to claim 8, wherein said liquid waste product is added substantially entirely to the denitrification reactor, in particular when this waste product has a BOD-value, expressed in mg $O_2$/l, which is at the most somewhat higher than 3.5 times the reduction of the nitrogen content, expressed in mg N/l, which has to be obtained by denitrification.

10. A method according to claim 1, wherein during the nitrification the pH of the liquid present in the nitrification reactor is maintained at or below pH 7.

11. A method according to claim 1, wherein solid particles present in said liquid waste product are removed in advance.

12. A method according to claim 1, wherein said liquid waste product is fermented in advance so as to lower the organic matter content of this product, in particular when this liquid waste product has a dry matter content higher than or equal to 4 to 5% by weight.

13. A method according to claim 1, wherein said aqueous fertilizer solution is separated by removing solid particles and/or flocks out of the nitrified fraction, in particular by sedimentation and/or membrane filtration techniques.

14. A method according to claim 1, wherein additional inorganic plant nutrition elements are added to the fertilizer solution.

15. A method for preparing an aqueous fertilizer solution from a liquid nitrogen-rich organic waste product comprising the steps of: supplying into a reactor a liquid of nitrogen-rich organic waste product having a nitrogen content below about 3500 mg nitrifiable nitrogen per liter, subjecting said organic waste product in said reactor to nitrifying bacteria to biologically convert said organic waste product into an aqueous fertilizer solution containing biologically stable nitrate, and removing said aqueous fertilizer solution from said reactor.

16. A method for preparing a fertilizer solution from a liquid nitrogen-rich organic waste product comprising the steps of: (a) supplying into a reactor a liquid nitrogen-rich organic waste product having a nitrogen content above about 3500 mg nitrifiable nitrogen per liter, (b) adding to said liquid nitrogen-rich organic waste product a denitrified aqueous fertilizer solution containing biologically stable nitrate so as to provide a mixture, (e) subjecting said mixture to nitrifying bacteria to biologically convert said mixture into an aqueous fertilizer solution containing biologically stable nitrogen, (d) removing said aqueous fertilizer solution from said reactor, (e) denitrifying a portion of said aqueous fertilizer solution from step (d), and (f) adding said portion of denitrified aqueous fertilizer solution from step (e) to the liquid nitrogen-rich organic waste product of step (b).

* * * * *